United States Patent [19]

Schwetje et al.

[11] Patent Number: 5,009,071
[45] Date of Patent: Apr. 23, 1991

[54] PROCESS FOR ADSORPTION COOLING/CONDITIONING BY MEANS OF LOW-TEMPERATURE HEAT

[75] Inventors: Norbert Schwetje, Hanover; Rudolf Sizmann; Noureddine Khelifa, both of Munich, all of Fed. Rep. of Germany

[73] Assignee: Kali-Chemie AG, Hanover, Fed. Rep. of Germany

[21] Appl. No.: 421,051

[22] Filed: Oct. 13, 1989

[30] Foreign Application Priority Data

Oct. 21, 1988 [DE] Fed. Rep. of Germany ....... 3835872

[51] Int. Cl.$^5$ ............................................... F25D 5/00
[52] U.S. Cl. ............................................. 62/4; 62/94; 252/67
[58] Field of Search ......................... 62/4, 94; 252/67

[56] References Cited

U.S. PATENT DOCUMENTS 4,010,620  3/1977  Telkes ..................................... 62/94
4,152,899  5/1979  Herrick .................................... 62/4

Primary Examiner—Ronald C. Capossela

[57] ABSTRACT

In a process for adsorption cooling/conditioning of rooms, working media are used which comprise saturated aqueous solutions of calcium salts with an added organic polyhydroxy compound. The working media are distinguished by high salt contents and low salt precipitation temperatures at very low water vapor partial pressures and are suitable for use in continuously operated adsorption/desorption cycles of adsorption cooling/conditioning systems having high coefficients of performance.

10 Claims, 1 Drawing Sheet

PROCESS FOR ADSORPTION COOLING/CONDITIONING BY MEANS OF LOW-TEMPERATURE HEAT

FIELD OF THE INVENTION

The present invention relates to a process for adsorption cooling/conditioning of rooms by adsorption/desorption of water by a working medium comprising a liquid hygroscopic salt solution, to the use of this salt solution as a working medium for adsorption cooling/conditioning, and to the composition of this salt solution.

BACKGROUND OF THE INVENTION

Adsorption cooling/conditioning systems (ACCS) are already known as such. Open thermochemical systems based on adsorption/ desorption of water are particularly advantageous. In this case, an adsorbent capable of binding water is used as the working medium. Typical adsorbents for thermochemical systems, which have been investigated so far, are salts such as lithium chloride or calcium chloride, acids such as sulfuric acid or phosphoric acid, or adsorbents based on silica and/or alumina, in particular silica gel, or silicates such as synthetic or natural zeolites.

The adsorbents used in the past have a number of disadvantages. Solid adsorbents such as, for example, zeolites are usually suitable only as "fixed working media" and therefore permit only a discontinuous procedure with respect to adsorption and regeneration or, if they are to be used as a "circulating working medium" in a continuous regeneration process, must meet special requirements with respect to form (preferably spherical), bulk density and abrasion resistance, because transportation of the adsorbent is then necessary, for example pneumatic transportation. By contrast, liquid working media can be pumped and are therefore advantageous. For use of such liquid working media in adsorption cooling/conditioning, however, high concentrations of dissolved salt in the working media are necessary. But high salt concentrations increase the tendency to salt precipitation, restrict the method of operation and reduce the reliability in use. There is a risk of the working medium solidifying, particularly at such sites of use which require air conditioning during the day and in the evening, but where the night temperatures can fall below, for example, 20° C. Solidification of the working medium would render the air-conditioning unit unusable for a prolonged period of time.

There is therefore the problem of combining a high salt concentration with a low precipitation temperature of the salt from the solution. Suitable working media should have low water vapor partial pressures at ambient temperature (adsorption process) and high partial pressures at slightly elevated temperatures (60° to 80° C.; desorption process, regeneration) and should be composed of inexpensive components which, as far as possible, are compatible with the environment.

SUMMARY OF THE INVENTION

It is the object of the invention to overcome these disadvantages of the prior art. The object is achieved by the process according to the invention, the use according to the invention and the salt solutions according to the invention.

The invention relates to a process for adsorption cooling/conditioning of rooms by adsorption/desorption of water by means of a working medium based on a liquid hygroscopic salt solution, comprising the steps of (a) generating a dry air stream by adsorption of water from a water-containing, optionally precooled, air stream to the working medium, (b) conditioning via evaporative cooling with take up of water by the dry air stream, and (c) regenerating the water-enriched working medium by desorption of water, using low-temperature heat and ambient air, characterized in that a salt solution containing 40 to 43% by weight of calcium chloride; 15 to 25% by weight, preferably 18 to 22% by weight, of calcium nitrate; 0.5 to 5% by weight, preferably 2 to 4% by weight, of an organic polyhydroxy compound; and water to make up to 100% by weight, is used as the working medium in step (a).

The process according to the invention is carried out in a known adsorption cooling/conditioning circuit, whose working medium is a hygroscopic, aqueous salt solution which, in the unloaded or regenerated state contains 40 to 43% by weight of calcium chloride, 15 to 25% by weight of calcium nitrate and 0.5 to 5% by weight of an organic polyhydroxy compound. The remaining proportion of the working medium is water, which is present in such proportions that the sum of all the components of the working medium totals 100% by weight in the unloaded or regenerated state.

In a preferred embodiment of the process of the invention, a salt solution containing 40 to 43% by weight of calcium chloride, 18 to 22% by weight of calcium nitrate, 2 to 4% by weight of an organic polyhydroxy compound and water to make 100% by weight is used as the working medium. In one example, a salt solution formed of 42% by weight of calcium chloride, 20% by weight of calcium nitrate, 3% by weight of organic polyhydroxy compound and 35% by weight of water is used.

Examples of organic polyhydroxy compounds which can he used include glycol, diethylene glycol or triethylene glycol, polyglycols, polyhydroxyaldehydes such as glucose and lactose, polyhydroxyketones such as fructose, and sugar alcohols such as glycerol, sorbitol and mannitol. In one example of the invention, glucose is used as the organic polyhydroxy compound.

BRIEF DESCRIPTION OF THE DRAWING

The invention will be explained in further detail hereinafter with reference to the accompanying FIG. 1, which is a schematic block diagram of a cooling/conditioning system adapted for carrying out an adsorption cooling/conditioning process in accordance with the invention.

DETAILED DESCRIPTION OF PREFERRED EMBODIMENTS

Figure 1:
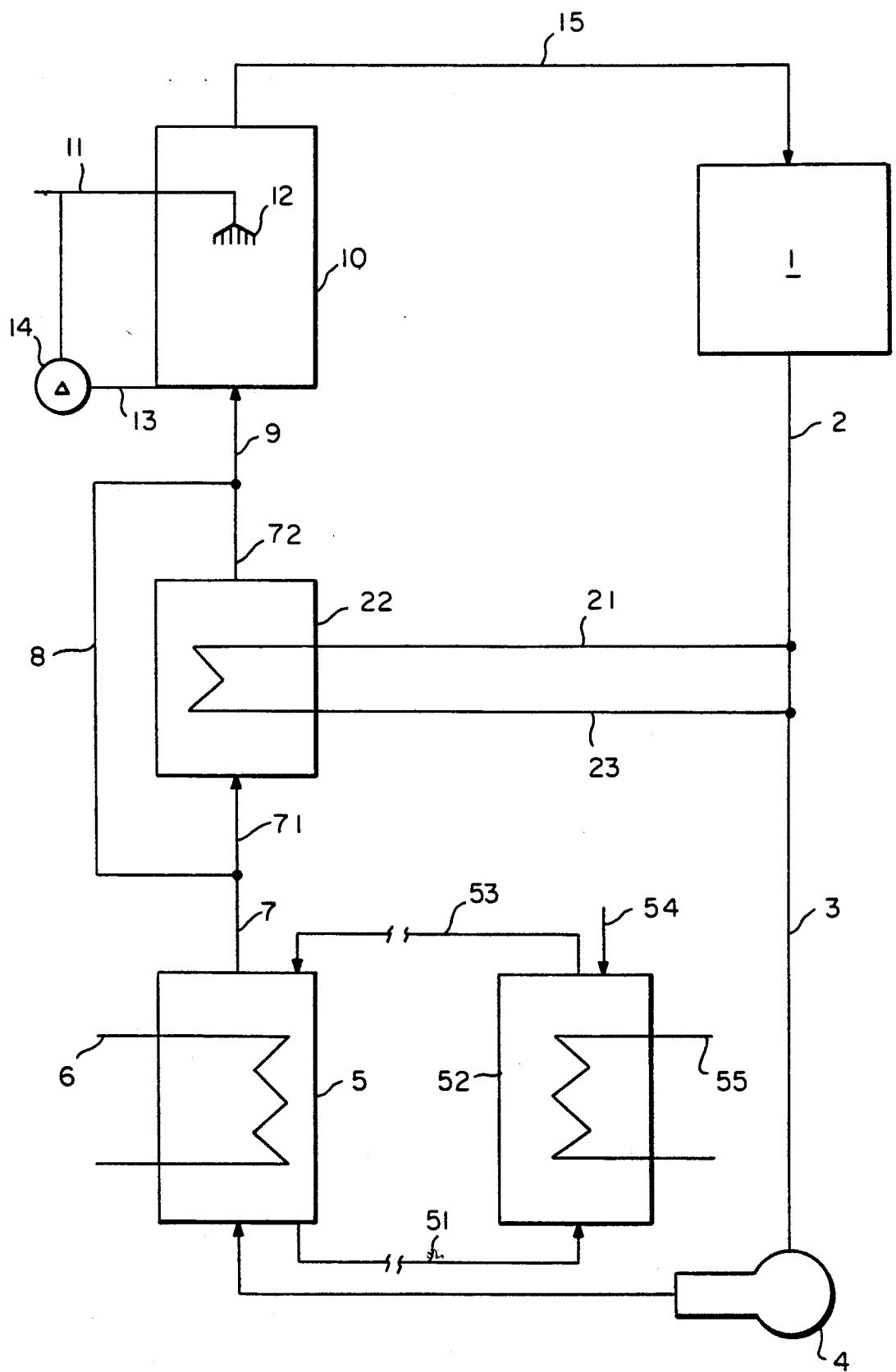

In FIG. 1, the block flow diagram of a known ACCS is shown by way of example, in which the process according to the invention can be carried out. From the room 1, which is to be cooled/ conditioned, an air stream is fed via lines 2 and 3 and transporting means 4 to a column 5 filled with working medium. In this column, moisture is withdrawn from the entering moist air stream by contact with dehydrated, that is to say energetically loaded working medium. This adsorption step thereby takes place as isothermally as possible, for which purpose the heat of adsorption generated in the column 5 is removed via a fluid heat exchange medium which is fed to the column via line 6 and is in heat exchange contact with the working medium. The dry air stream leaving the column 5 via line 7 is at the same as or slightly higher temperature than the air stream entering the column 5. The temperature difference which thereby arises depends essentially on the flow velocity of the air stream and on the intensity of the heat exchange. The dry air stream is passed via lines 8 and 9 to a humidification chamber 10. Water is introduced into this chamber via line 11 and spray device 12. Excess water can be recycled via line 13 and transporting means 14. The dry air stream entering the chamber 10 absorbs water vapor as a result of vaporization, which takes place substantially adiabatically, until it is saturated, and the air stream is simultaneously cooled, so that a cool, moist air stream leaves the chamber 10 and is fed via line 15 to the room 1.

In a variation of the process according to the invention, the air to be removed from the room 1 (i.e., the room exit air) can additionally be passed over a separate vaporizer. The room exit air, whose relative humidity will generally have a value of about 55% (since such a relative humidity of 55% is felt as comfortable at a pleasant room temperature of about 22° C.), is loaded in this vaporizer up to 100% humidity, whereby additional cooling capacity is produced.

In a further variation, a heat exchanger 22 can be inserted to which air leaving room is conveyed, either completely or partially, via line 21 and returned via line 23, and in which the air is in heat-exchange contact with the dry air. For feeding and discharging dry air, the heat exchanger 22 is connected to lines 71 and 72, through which the dry air stream can be passed either completely or partially.

Energetically unloaded working medium in the column 5, that is to say working medium charged with water, can also be dehydrated in a known manner and thus be energetically loaded. This dehydration can take place either discontinuously, by connecting two or more columns 5 in parallel and at least one column for loading and unloading being available at any time. Preferably, however, the loading and unloading is carried out continuously. One possible embodiment of this variation is to pass the working medium in countercurrent flow relative to the air stream through column 5 and to circulate it via a line 51 through the regeneration column 52 and then back via line 53 to the column 5. In the regeneration column 52, the working medium is regenerated by feeding ambient air (via a line 54) in countercurrent flow whereby water is desorbed. The heat of desorption required for this purpose is supplied to the regeneration column 52 via a fluid heat exchange medium which is conveyed to the regeneration column via line 55 and is in heat-exchange contact with the working medium.

For the energetic loading (regeneration) of working medium, thermal energy from different sources can be used. Heating can either be carried out directly in a conventional manner by means of primary energy or electricity, or waste heat can be utilized, for example from conventional heating systems or internal combustion engines, or energy from the environment for example solar energy, can be utilized either directly or after transformation by means of a heat pump.

The process according to the invention can be suitably carried out using low-temperature heat, for example at a temperature as low as from 60° to 80° C. As used herein, the term "low-temperature heat" is intended to refer to operating temperatures of about 80° C. or lower. In one example of the process, the regeneration of the working medium is accomplished at temperatures of about 50° C. The process operates in an advantageous manner with an open, unpressurized air circulation, without vacuum, without volatile refrigerants and without toxic materials.

The invention also relates to the use of hygroscopic aqueous salt solutions containing
  40 to 43% by weight of calcium chloride,
  15 to 25% by weight, preferably 18 to 22% by weight, of calcium nitrate,
  0.5 to 5% by weight, preferably 2 to 4% by weight, of an organic polyhydroxy compound, and
  water to make 100% by weight, as a working medium for adsorption cooling/conditioning of rooms.

The invention also relates to a working medium for adsorption cooling/conditioning of rooms by means of low-temperature heat, containing
  40 to 43% by weight of calcium chloride,
  15 to 25% by weight, preferably 18 to 22% by weight, of calcium nitrate,
  0.5 to 5% by weight, preferably 2 to 4% by weight, of an organic polyhydroxy compound, and
  water to make 100% by weight.

The working medium according to the invention is distinguished by a number or advantages over conventional working media. On the one hand, it has low water vapor partial pressures at ambient temperature (adsorption process), for example 400 Pa at 20° C., and adequately high partial pressures at elevated temperatures (for example 60° to 80° C., desorption process).

Using the working media according to the invention, the low-temperature heat range with temperatures of as low as about 50° C. can be utilized very effectively. Thus, the working media of the invention allow a high coefficient of performance (COP) of the adsorption cooling/conditioning unit, that is to say the ratio of cooling power to invested thermal power from the low-temperature heat turns out to be extremely favorable. Under normal operating conditions of the adsorption cooling/conditioning unit, a favorable COP of 1 can be reached. The inlet and outlet lines of the adsorption cooling/conditioning unit do not require any thermal insulation, since the cooling/conditioning is first produced at the desired point through evaporative cooling and cold is generated by water absorption. Cold, water vapor-saturated air at about 13° C. is thus formed, which flows directly into the room which is to be cooled/conditioned. For controlling the cooling/conditioning, a warmer dry air stream can also be additionally mixed with the cold, water vapor-saturated stream, and only this air stream at an adjusted temperature and humidity can be fed to the room. An easily controllable system is thus available, by means of which pleasant room temperatures and comfortable relative atmospheric humidities can be set.

Compared to the solid working media used in the past for adsorptive air-conditioning, the liquid working media of the invention have process engineering advantages, since they can easily be pumped and thus allow continuous regeneration of the working medium without any difficulty during operation of the air-conditioning unit.

Furthermore, due to the inclusion of organic polyhydroxy compounds in the salt solution, the corrosive properties of the salt solution unexpectedly decrease. Thus, without addition of organic polyhydroxy compounds, an aluminum sheet is rapidly corroded in the salt solution at 20° C.; whereas only slight signs of corrosion are detectable even after several months in salt solutions which contain an organic polyhydroxy compound such as, for example, glucose.

The most outstanding advantage of the working media according to the invention is, however, that they have unexpectedly low precipitation temperatures of less than 20° C. When glucose is added as the organic polyhydroxy compound, it is even possible, for example, to reach a precipitation temperature as low as about 14° C. This provides reliability in use as a hygroscopic liquid for the operation of unpressurized adsorption-/cooling units using a medium compatible with the environment (no chlorofluorohydrocarbon) for many applications.

The following examples are intended to illustrate the invention in further detail without, however, restricting its scope.

EXAMPLE 1

The working medium according to the invention was used in an ACCS according to FIG. 1 and its cooling-/conditioning effect was investigated.

Moist room air (from room 1) was blown by means of a circulating device 4 into the adsorption column 5 which was filled with working medium (Example 4) and freed from its water vapor content during passage therethrough. The heat of adsorption which arose was removed by the internal heat exchanger 6. The air stream, which was now dry and had not increased in temperature, was fed to the humidification chamber 10, in which it absorbed water vapor by substantially adiabatic vaporization of water up to its saturation point and was simultaneously cooled. The cool, moist air stream was fed to the room 1 which was to be cooled/conditioned.

At the same time, the adsorption medium was passed through a desorption column in a regeneration circuit. In the desorption column, the working medium flowed countercurrently to a stream of ambient air, which was heated up by an available heat source. The warm air stream stripped water vapor from the absorbent and made it usable again for the adsorption circuit. The regenerated adsorption medium was then fed again to the adsorption column 5.

While the process was being carried out, the external conditions were preset at an external temperature of 31° C., an external relative atmospheric humidity of 50% and a desorption temperature of about 50° C. Under these conditions, a temperature of the cooled air of 13° C. at 100% relative atmospheric humidity was achieved. By feeding this cool moist air stream into the room 1, the room temperature was adjusted there to 22° C. and the relative atmospheric humidity in the room was adjusted to 55%.

Under these conditions, the COP was 1. At COP=1 the working medium had an energy storage capacity of 750 kWh/m$^3$.

EXAMPLE 2

Comparative Example

A working medium suitable for the process according to the invention should have a water vapor partial pressure of about 400 Pa (Pa=Pascal) at 20° C. To adjust to this value, 60 g of calcium chloride in 100 g of aqueous solution are required.

It was possible to prepare such a saturated, 60% by weight aqueous calcium chloride solution at 40° C., to cool it as a metastable solution down to 20° C. and then to measure the water vapor partial pressure of this supersaturated solution at 20° C. In spite of the suitable water vapor partial pressure, such a metastable solution cannot be used as a working medium since, even though frequently only after a long time, the excess salt nevertheless crystallizes out.

EXAMPLE 3

Comparative Example

62% by weight aqueous salt solution consisting of a binary salt combination of 42% by weight of calcium chloride and 20% by weight of calcium nitrate was prepared. The water vapor partial pressure of this binary salt combination, which is really stable at 20° C. (that is to say no salt crystallizes out) is in the range of 400 Pa at 20° C. Admittedly, this binary salt combination is thus suitable for some applications: However, precipitation temperatures lower than 20° C. cannot be achieved with such binary salt combinations.

EXAMPLE 14

An aqueous salt solution according to the invention was prepared from 42% by weight of calcium chloride, 20% by weight of calcium nitrate and 3% by weight of glucose. The water vapor partial pressure of this binary salt combination with added glucose was in the range of 400 Pa at 20° C. This binary salt combination with added glucose is stable down to temperatures of 14° C., that is to say no salt crystallizes out. Such binary salt combinations with added glucose are thus outstandingly suitable as a working medium for adsorption/conditioning cooling units.

The foregoing description and examples have been set forth merely to illustrate the invention and are not intended to be limiting. Since modifications of the disclosed embodiments incorporating the spirit and substance of the invention may occur to persons skilled in the art, the scope of the invention should be limited solely by reference to the appended claims and equivalents.

What is claimed is:

1. A process for adsorption cooling conditioning of rooms by adsorption/desorption of water by a working medium comprising a liquid hygroscopic salt solution, said process comprising the steps of
    (a) producing a dry air stream by adsorption of water from a water-containing air stream into an initial working medium to produce a water-enriched working medium,
    (b) conditioning via evaporative cooling with water absorption by said dry air stream, and
    (c) regenerating the water-enriched working medium by desorption of water using low-temperature heat and ambient air;
    wherein said initial working medium is a salt solution comprising:
    40 to 43% by weight of calcium chloride,
    15 to 25% by weight of calcium nitrate,
    0.5 to 5% by weight of an organic polyhydroxy compound, and
    water to make 100% by weight.

2. A process according to claim 1, wherein said air stream is precooled prior to the adsorption of water into the working medium to generate said dry air stream.

3. A process according to claim 1, wherein said working medium is a salt solution comprising from 18 to 22% by weight calcium nitrate.

4. A process according to claim 1, wherein said working medium is a salt solution comprising from 2 to 4% by weight organic polyhydroxy compound.

5. In a process for adsorption cooling/conditioning of rooms comprising adsorbing water from moist air into a working medium to form dry air; cooling and conditioning room air by evaporating water into said dry air, and desorbing water from said medium to regenerate the working medium, the improvement comprising using a hygroscopic aqueous salt improvement comprising using a hygroscopic aqueous salt solution comprising

- 40 to 43% by weight of calcium chloride,
- 15 to 25% by weight of calcium nitrate,
- 0.5 to 5% by weight of an organic polyhydroxy compound, and
- water to make 100% by weight, as a working medium for the adsorption cooling/conditioning.

6. A process according to claim 5, wherein said aqueous salt solution comprises from 18 to 22% by weight calcium nitrate.

7. A process according to claim 5, wherein said aqueous salt solution comprises from 2 to 4% by weight of said organic polyhydroxy compound.

8. In a process for adsorption cooling/conditioning of rooms comprising adsorbing water from moist air into a working medium to form dry air; cooling and conditioning room air by evaporating water into said dry air, and desorbing water from said medium by means of low-temperature heat to regenerate the working medium, the improvement comprising using an aqueous salt solution containing

- 40 to 43% by weight of calcium chloride,
- 15 to 25% by weight of calcium nitrate,
- 0.5 to 5% by weight of an organic polyhydroxy compound, and
- water to make 100% by weight, as a working medium for the adsorption cooling/conditioning.

9. A process according to claim 8, wherein said aqueous salt solution comprises from 18 to 22% by weight calcium nitrate.

10. A process according to claim 8, wherein said aqueous salt solution comprises from 2 to 4% by weight of said organic polyhydroxy compound.

* * * * *